US007961756B1

(12) United States Patent
Lambert et al.

(10) Patent No.: US 7,961,756 B1
(45) Date of Patent: Jun. 14, 2011

(54) INTEGRATED MULTIMEDIA SYSTEM

(75) Inventors: Paul Aerick Lambert, Mountain View, CA (US); Lu Chang, Cupertino, CA (US); Ranjeet Shetye, Cupertino, CA (US)

(73) Assignee: PicoMobile Networks, Inc., Sunnyvale, CA (US)

( * ) Notice: Subject to any disclaimer, the term of this patent is extended or adjusted under 35 U.S.C. 154(b) by 859 days.

(21) Appl. No.: 11/775,347

(22) Filed: Jul. 10, 2007

Related U.S. Application Data

(60) Provisional application No. 60/860,580, filed on Nov. 21, 2006.

(51) Int. Cl.
*H04J 3/22* (2006.01)
*H04M 1/00* (2006.01)
(52) U.S. Cl. ......................... 370/469; 455/574
(58) Field of Classification Search .................. 370/318, 370/469; 710/58–59
See application file for complete search history.

(56) References Cited

U.S. PATENT DOCUMENTS

| | | | |
|---|---|---|---|
| 5,738,583 A | 4/1998 | Comas et al. | |
| 6,272,120 B1 | 8/2001 | Alexander | |
| 6,600,726 B1 | 7/2003 | Nevo et al. | |
| 6,690,935 B1 | 2/2004 | Calot et al. | |
| 6,704,866 B1 | 3/2004 | Benayoun et al. | |
| 6,707,801 B2 | 3/2004 | Hsu | |
| 6,760,587 B2 | 7/2004 | Holtzman et al. | |
| 6,785,892 B1 * | 8/2004 | Miller et al. ................ | 719/313 |
| 6,788,675 B1 | 9/2004 | Yang | |
| 6,793,580 B2 | 9/2004 | Sinclair et al. | |
| 6,795,701 B1 | 9/2004 | Baker et al. | |
| 6,799,056 B2 | 9/2004 | Curley et al. | |
| 6,859,460 B1 | 2/2005 | Chen | |
| 6,879,574 B2 | 4/2005 | Naghian et al. | |
| 6,879,812 B2 | 4/2005 | Agrawal et al. | |
| 6,909,705 B1 | 6/2005 | Lee et al. | |
| 6,932,698 B2 | 8/2005 | Sprogis | |
| 7,013,391 B2 | 3/2006 | Herle et al. | |
| 7,072,323 B2 | 7/2006 | Roberts et al. | |
| 7,073,129 B1 | 7/2006 | Robarts et al. | |
| 7,085,257 B1 | 8/2006 | Karves et al. | |
| 7,097,562 B2 | 8/2006 | Gagner | |
| 7,143,171 B2 | 11/2006 | Eriksson et al. | |
| 7,181,544 B2 | 2/2007 | Vangal et al. | |
| 7,224,964 B2 | 5/2007 | Souissi et al. | |
| 7,236,772 B1 | 6/2007 | Botzas | |

(Continued)

OTHER PUBLICATIONS

IEEE Standards Board.IEEE 802.11 Standard, 1999. 1999 Edition (R2003).

(Continued)

*Primary Examiner* — Patrick N Edouard
*Assistant Examiner* — Huy C Ho

(57) ABSTRACT

A communications processor includes a first upper layer module to execute one or more upper layer protocols and a data link layer module to execute a data link layer protocol. A host processor includes a second upper layer module to execute the one or more upper layer protocols. A switching module causes the communications processor to operate in a first state or a second state. The communications processor executes only the data link layer protocol and none of the one or more upper layer protocols when the communications processor operates in the first state, and executes the data link layer protocol and the one or more upper layer protocols when the communications processor operates in the second state. The power saving module prevents the host processor from executing the one or more upper layer protocols executed by the communications processor when the communications processor operates in the second state.

15 Claims, 4 Drawing Sheets

U.S. PATENT DOCUMENTS

| | | |
|---|---|---|
| 7,251,235 B2 | 7/2007 | Wentink |
| 7,324,444 B1 | 1/2008 | Liang et al. |
| 7,400,722 B2 | 7/2008 | Qi et al. |
| 7,440,430 B1 | 10/2008 | Jagadeesan et al. |
| 7,452,278 B2 | 11/2008 | Chen et al. |
| 2002/0151366 A1 | 10/2002 | Walker et al. |
| 2002/0191560 A1 | 12/2002 | Chen et al. |
| 2002/0199124 A1 | 12/2002 | Adkisson |
| 2003/0069018 A1 | 4/2003 | Matta et al. |
| 2003/0182454 A1 | 9/2003 | Huth et al. |
| 2003/0231625 A1 | 12/2003 | Calvignac |
| 2004/0066751 A1 | 4/2004 | Tseng et al. |
| 2004/0105415 A1 | 6/2004 | Fujiwara et al. |
| 2004/0127277 A1 | 7/2004 | Walker et al. |
| 2004/0174829 A1 | 9/2004 | Ayyagari |
| 2004/0185851 A1 | 9/2004 | Nagai |
| 2004/0196808 A1 | 10/2004 | Chaskar et al. |
| 2005/0025163 A1 | 2/2005 | Christie |
| 2005/0032577 A1 | 2/2005 | Blackburn et al. |
| 2005/0041660 A1 | 2/2005 | Pennec et al. |
| 2005/0041793 A1 | 2/2005 | Fulton et al. |
| 2005/0073980 A1 | 4/2005 | Thomson et al. |
| 2005/0079873 A1 | 4/2005 | Caspi et al. |
| 2005/0099977 A1 | 5/2005 | Williams et al. |
| 2005/0157661 A1 | 7/2005 | Cho |
| 2005/0177639 A1 | 8/2005 | Reunamaki et al. |
| 2005/0181872 A1 | 8/2005 | Acharya et al. |
| 2005/0197189 A1 | 9/2005 | Schultz |
| 2005/0250487 A1 | 11/2005 | Miwa et al. |
| 2005/0250497 A1 | 11/2005 | Ghosh et al. |
| 2005/0268003 A1 | 12/2005 | Wang et al. |
| 2005/0286456 A1 | 12/2005 | McNew et al. |
| 2006/0041750 A1 | 2/2006 | Carter et al. |
| 2006/0045138 A1 | 3/2006 | Black et al. |
| 2006/0063539 A1 | 3/2006 | Beyer |
| 2006/0135262 A1 | 6/2006 | Kennedy et al. |
| 2006/0172736 A1 | 8/2006 | Nevo |
| 2006/0205409 A1 | 9/2006 | Chiou et al. |
| 2006/0221857 A1 | 10/2006 | Bushnell et al. |
| 2006/0268711 A1 | 11/2006 | Doradla et al. |
| 2007/0026866 A1 | 2/2007 | Krishnamurthi et al. |
| 2007/0035513 A1 | 2/2007 | Sherrard et al. |
| 2007/0047547 A1 | 3/2007 | Conner et al. |
| 2007/0047697 A1 | 3/2007 | Drewry et al. |
| 2007/0060355 A1 | 3/2007 | Amaitis et al. |
| 2007/0076683 A1 * | 4/2007 | Chung et al. .................. 370/350 |
| 2007/0082671 A1 | 4/2007 | Feng et al. |
| 2007/0086394 A1 | 4/2007 | Yamada et al. |
| 2007/0099703 A1 | 5/2007 | Terebilo |
| 2007/0197237 A1 | 8/2007 | Powell et al. |
| 2007/0202910 A1 | 8/2007 | Brewer et al. |
| 2008/0039015 A1 | 2/2008 | Nakata et al. |
| 2008/0069105 A1 | 3/2008 | Costa et al. |
| 2008/0095112 A1 | 4/2008 | Wiemann et al. |
| 2008/0123608 A1 | 5/2008 | Edge |
| 2009/0191878 A1 | 7/2009 | Hedqvist et al. |
| 2009/0222358 A1 | 9/2009 | Bednarek |
| 2010/0093374 A1 | 4/2010 | Dacosta et al. |

OTHER PUBLICATIONS

Newton, Harry. Newton's Telecom Dictionary. 15th Edition. Miller Freeman Inc., 1999. 762. (3 pages).

* cited by examiner

INTEGRATED MULTIMEDIA SYSTEM

The present application claims benefit of Provisional Application No. 60/860,580 filed Nov. 21, 2006, the contents of which are incorporated herein by reference.

FIELD OF THE INVENTION

The present invention relates to communication devices, especially those receiving packetized multimedia data streams.

BACKGROUND OF THE INVENTION

Many current wireless communication devices incorporate means for receiving a stream of audio and/or video input according to one or more well known protocols and systems such as TCP/IP, IP Multimedia Subsystem, General Access Network, softswitches, and SIP, which may overlap or complement each other. The goal of these protocols are a combination of reliability, economy and rapid response critical to real time delivery of a data stream. Real time, continuous data delivery is critical for comprehension, appreciation and aesthetic effect of multimedia streams. As these features are incorporated onto mobile devices, like cell phones, size and power consumption also becomes a critical design criteria.

Current mobile devices for wireless communications have become quite complex. However, microprocessor means are provided for these mobile devices, where memory and a real time clock are effectively connected to a processor or processors and a control program directs operations of the mobile device. Current mobile devices often have multiple processors. In a well known structure, a host processor and a communications processor provide a mobile device processing. The purpose of the host processor is to off-load the work of processing the local applications and functions of the mobile device from the processing and management of signal traffic for wireless transmissions and receptions for the mobile device. The communications processor provides the processing interface between wireless communications networks, such as cellular or 802.xx wireless LAN's, and the mobile device.

In applying this dual or multiple processing structure to wireless data transmission and reception for the mobile device, the communications processor can be dedicated solely, for the data communication function, operate data link layer processing. The well known five layer model of data packet transmission includes Application, Transport, Network, Data Link and Physical Layers, each operating under well known protocols by way of standards organizations. A communication processor dedicated to data link layer processing leaves the host processor free to operate to provide processing for higher layer protocols. This data link layer processing at the communications processor, in the prior art, is provided either continuously or only upon demand while the host processor is operational. Dedicating the communications processor to data link layer processing is a substantial benefit for maximizing the bandwidth or transmission and reception capacity of the wireless communication link between the mobile device and the wireless network. Such a dedicated communications processor makes it, in effect, always available for the communication of data at the full data capacity of the wireless communication link.

The benefit of maximizing communication capacity of a wireless communication link or connection is at the cost of operating multiple processors in a battery operated mobile device. Operating several processors, while efficient for distribution of processing, consumes substantially more power than equivalent processing taking place on a single processor. Providing a host processor engaging in processing communications protocols above the data link layer and a separate communications processor engaging in processing for the data link layer results in both processors necessarily operating and being active during any wireless communications sessions. It then follows that providing a host processor and communications processor instead of a single processor for the mobile device increases power consumption that reduces talk time and stand-by time of the mobile device.

Current wireless communication devices include cellular phones, wi-fi enabled devices, and other such devices capable of transmitting and receiving packetized data streams. Multimedia communications with mobile devices have increased and will become more important as data communications capacities for wireless communications increases. As the prior art division of data link layer processing into a communications processor will likely continue to preserve the full use of data communication capacity of the wireless link, the problem of increased power consumption by multiple processors in mobile devices will increase as increased data rates encourage greater use of the mobile devices for multimedia transmission and playout. Where a single processor is used for processing all protocol layers, some modes will mitigate power usage (like IEEE 802.11 UAPSD), but if RTP processing is contained on a different processor from the data link layer processing, both processors will need to be active. Power management by simple coordination of processing functions among the processors is not practical in the prior art. As packets flow from processor to processor, each processor may not be able determine if it would be able to enter a low-power inactive mode.

The implementation low power integrated multimedia systems would clearly benefit from improved real-time performance and power saving capabilities. There is a need for a system which similarly provides for processor partitioning of protocols that support adaptive usage of presently devoted processors in wireless communication devices to minimize power usage and to improve real time performance and power management of multimedia streams.

SUMMARY OF THE INVENTION

The present invention is an integrated multimedia system in a wireless communication device enabled to receive a packetized audio and/or video data stream via a packet network, where the system is further enabled for adaptive usage of presently devoted processors in wireless communication devices for a communications processor and a host processor (s) to minimize power usage and to improve real time performance of incoming multimedia streams. Such systems minimize multimedia (voice and/or video) artifacts which interfere with the comprehension, appreciation or aesthetic effects of the played out multimedia data stream for the local user.

The present invention endows a communication processor with functions of the network, transport and/or application protocols so that such functions can be transitorily or permanently performed at the communication processor instead of the host processor. The primary, host processor enters one or more lower power modes while data traffic is processed on the communications processor. The distribution or partitioning of protocols provides benefits for architectural efficiency that improves the real-time performance characteristics and enables the implementation of new and unique power saving modes of operation.

The functions of the physical network are well known and include wired and wireless communication equipment adapted for network links. The data link layer includes functions under the well known protocols for IEEE 802.11, 802.16, ATM, GPRS, PPP, and frame relay, among many others. The network layer includes functions under the well known protocols IP (IPv4 or v6), IGMP, IPsec, ESP, and RSVP, among many others. The transport layer includes functions under the well known protocols TCP, UDP, etc. The application layer includes functions under the well known protocols SIP, RTP, RTCP, TLS/SSL, SDP, etc.

For example, network, transport and/or application protocols can be partitioned according optimization steps so that some of the functions that in the prior art have been accomplished solely at the host processors can be performed at the communication processor. A more specific list of preferred embodiments are as follows:

A mobile device has a baseband communication processor and one or more host protocol processors where the baseband communication processor executes data link layer protocol as well as one or more upper layer protocols of the following list: IP, UDP, ESP, RTP and or other network, transport or application level protocols.

A mobile device has a baseband communication processor and one or more host protocol processors where the baseband communication processor executes data link layer protocol and also executes an upper layer protocol, i.e., multimedia framing (an RTP function).

A mobile device has a baseband communication processor, executing a data link layer protocol, and one or more host protocol processors executing upper level protocols. The communication processor comprises a received packet interface for an incoming multimedia stream, where two or more of voice, video, image or data media streams are received simultaneously. The data packets are temporarily stored and associated with a priority for processing by the host processor based upon quality of service prioritized at a communication processor interface to map thereat a media link quality of service to an on-chip media type. For example, said chip interface would be physical location of providing for selection for priority delivery of at least a portion of a stream of voice input to the host processor in preference to video or data input received from a multimedia server.

An application processing interface (API) adapted for inputting and adapting the invention system to mobile device has a baseband communication processor and one or more host protocol processors, where the API provides means for selecting options of prioritization for media types at the communication processor interface.

A mobile device has a baseband communication processor and one or more host protocol processors where the baseband communication processor operates to accomplish network layer cryptographic security acceleration protocols.

A mobile device has a baseband communication processor and one or more host protocol processors where the baseband communication processor operates to accomplish link layer protocols.

A mobile device has a baseband communication processor and one or more host protocol processors where the host processor operates to accomplish call control protocols, including SIP.

A mobile device has a baseband communication processor and one or more host protocol processors where the baseband communication processor operates to accomplish data stream forwarding with simplified functionality optimized for multimode handoff.

A mobile device has a baseband communication processor and one or more host protocol processors where the baseband communication processor operates to accomplish IPsec ESP functions. When other protocols or encapsulated addresses are to be supported, an outer ESP identifier would be changed.

DETAILED DESCRIPTION OF THE INVENTION

The invention is now discussed with reference to the figures.

Figure 1:
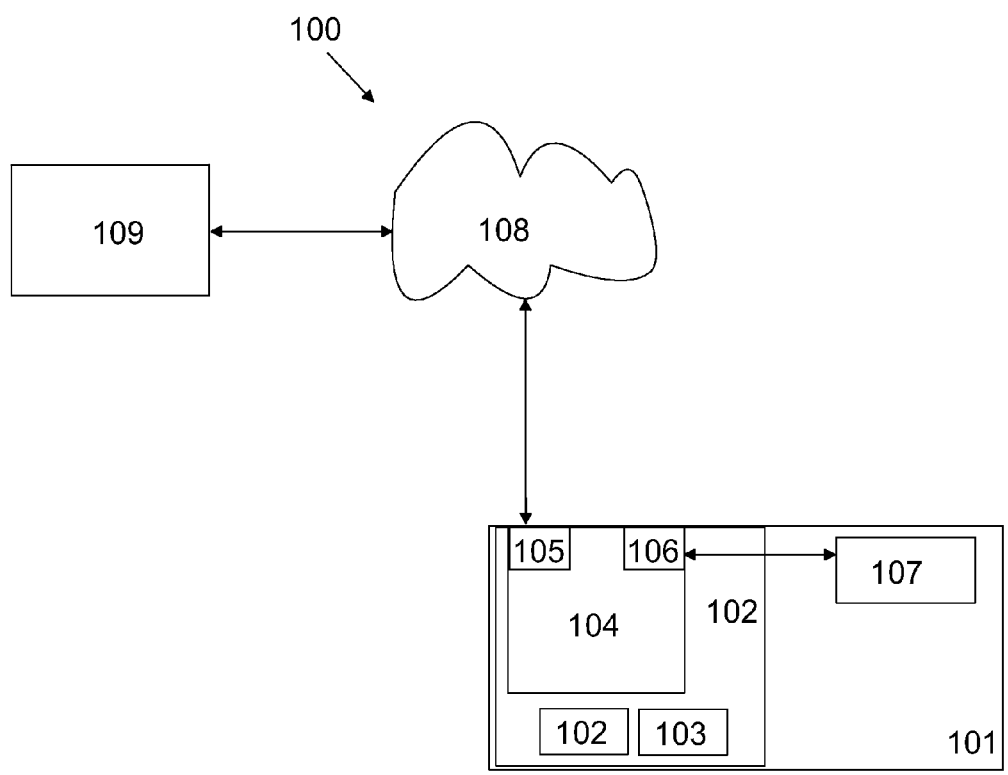
FIG. 1 is a block diagram of a mobile device in a wireless data packet communication session through a packet network with a remote data device, where the invention system of power saving by allocation of protocol processing is accomplished at the mobile device.

FIG. 1 is a block diagram of the invention system 100 having a mobile device 101 in a wireless data packet communication session through a packet network 109 with a remote data device 108, where the invention system 100 of power saving by allocation of protocol processing is accomplished at the mobile device 101.

Mobile device 101 is a battery powered mobile communications device such as a mobile cellular phone enabled for packet data traffic, enabled for wireless communications via wireless LAN operating under one of the IEEE 802.11 protocols, enabled for wireless communications via wireless peer network operating under one of the IEEE 802.15 or 802.16 protocols, or equivalent wireless communication networks capable of supporting data packet communications under layered protocols as described above. Mobile device 101 comprises a microprocessor means 102 comprising multiple processors 104 and further having a received packet input/output unit or interface 105 (for receiving and transmitting data packets wirelessly) and a user input/output unit or interface 106 (for playout of data on user interface 107), memory 102 and a real time clock 103. Multiple processors 104 comprises a communications processor and one or more host processors, where:

A data set is communicated between the battery powered, wireless mobile device 101 and a remote data device 109 incorporating a wireless communications link directly between the mobile device 101 and a wireless communications network 108 adapted for data packet communications comprising:

(a) the mobile device 101 having a wireless communication module, an input/output unit effectively connected with the wireless communication module, and a microprocessor means effectively connected with the input/ output means and having a memory, a real time clock, a communications processor and one or more host processors operable by a control program to process a first data set to packetize it for transmission to the remote data device or to process packets of a second data set received from the remote data device to produce the second data set;

(b) the communications processor having first upper layer means for executing of one or more of a set of upper layer protocols and data link layer means for executing of a data link layer protocol;

(c) the host processor or processors having second upper layer means for executing of one or more of the set of upper layer protocols;

(d) switching means for causing the communications processor to, in a first state, execute only the data link layer protocol and no upper layer protocols, and, in a second state, execute the data link layer protocol and one or more of the set of upper layer protocols; and (e) power saving means for preventing the host processor or processors from executing one or more of the set of upper layer protocols that are executed by the communications processor in the second state.

Operation of the switching means to initiate the first state or the second state include:

1. Detection by the host processor or the communication processor that no data packets are being received or transmitted by the mobile device, where the communication processor is configured to execute all upper layer protocols and the host processor is placed in a lower power operation mode. In this state, no data packets are being received wirelessly or being prepared for wireless transmission and that the host processors' capacity for processing packets is not necessary. The communication processor preferably comprises means for receiving, storing temporarily in a receiving interface buffer and counting received packets. Said buffer allows for at least a first portion of a new incoming data set to be fully processed through the communication processor with data link layer and upper layer protocols until the host processors are brought back to full power on occurrence of a switching event. Processing of the upper layer protocols by the communication processor in the second state is preferably restricted to a minority of the time that data packets are transmitted or received by the communication processor, in that providing processing capacity directed to managing the wireless communications link is more desired than processing of upper layer protocols. Where the communication processor does provide all the data link layer and upper layer protocol processing, a playout output of packets fully processed by the communication processor are preferably directed to decoder for audio playout or display. In the first state, the playout output would be made from the host processors. Alternately, data stored in the memory of the mobile device may be fully packetized by operation of only the communication processor in the second state and then transmitted wirelessly.

2. Providing the communication processor with means for comparing a predetermined packet transmission reception rate or number of transmitted or received packets to actual, current values of those rates or numbers of packets. If the communication processor provides all or a portion of processing of packets under upper layer protocols (i.e., the second state) and a current value of a rate or number of packets exceeds a maximum predetermined rate or number of packets, the switching means act to stop execution of one or more of the upper layer protocols currently being executed by the communication processor and provide for execution of the stopped upper layer protocol of the communication processor to be executed by the host processor. Alternately, the communication processor in the second state is provided with means for determining a current available processing capacity of the communication processor which is compared with a minimum value, where execution of one or more upper layer protocols at the communication processor are stopped and their functions shifted to the host processor if the current available processing capacity falls below a predetermined minimum value.

3. Providing the mobile device with means, when operating in the first state, for determining a current battery power and expected amount of time for continued operation of the mobile device. The control program acts to compare the current battery power or life with a predetermined minimum value, where, if the switching means are in the first state and the battery power or life is less than the predetermined minimum value number, the switching means acts to stop processing of all upper level protocol by the host processors and execute all upper level protocols in the communication processor, as in the second state.

4. Providing power saving means for determination of a second threshold value for terminating operation of the second state to return all processing of upper layer protocol to the host processor.

Figure 2:
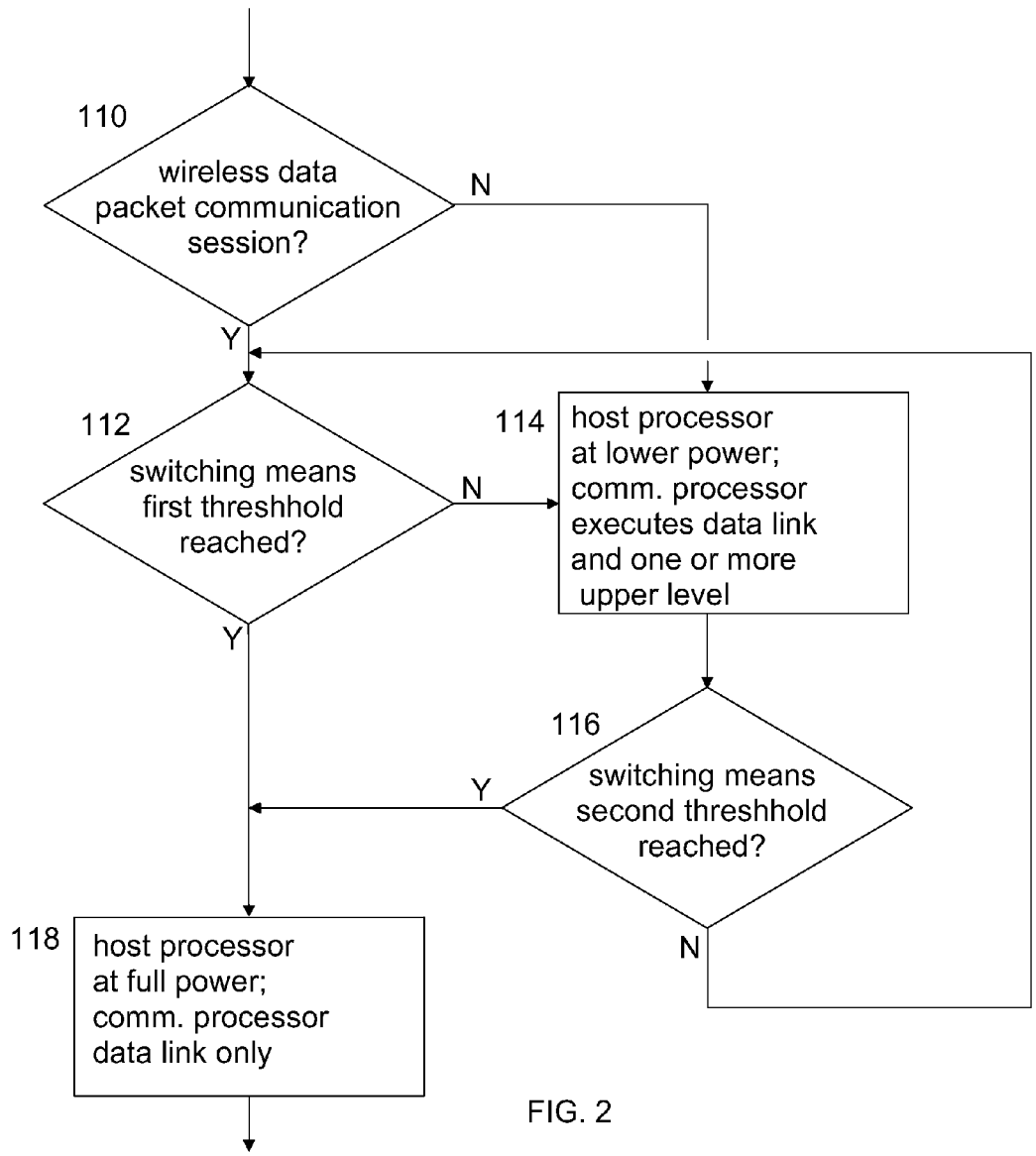
FIG. 2 is a flow diagram of the invention system allocating processing of upper layer protocols at a communications processor in a power saving mode where a host processor executes such upper layer protocols at a regular power mode.

FIG. 2 is a flow diagram of the invention system allocating or shifting processing of upper layer protocols from a host processor to a communications processor in a second state or power saving mode where the host processor executes such upper layer protocols at a first state or regular power mode. Step 110 requires determination of the state of the processors as to a current wireless data packet communication session. If there is no current session, step 114 is taken so that processing of future packet traffic through the host processor and communication processor requires that one or more upper layer protocols are executed by the communication processor. If there is a current session, a control program acts to determine whether a first threshold activating switching means to activate the second state as described above have been reached. If such first threshold has not been reached, step 114 is taken. If the first threshold has been reached, operation of the second state is terminated to return all processing of upper layer protocol to the host processor in step 118. Upon activation of the second state in step 114, if a second threshold value has been reached at step 116, operation of the second state is terminated to return all processing of upper layer protocol to the host processor in step 118. If a second threshold value has not been reached at step 116, operation of the second state is continued and the process is returned to step 112 periodically.

The invention system is especially useful where voice communications are proceeding by way of data packets between the mobile device and the remote data device, i.e., a conversation takes place between two separated users of devices enabled for IEEE 802.11 wireless LAN or Bluetooth IEEE 802.16.

In a two chip embodiment where visual data is not being communicated, a communication processor operates on all voice communication data packets and directs playout directly to playout means such as a decoder, analog/digital means, and a speaker or microphone as appropriate. The relatively reduced processing load of this communication allows for lower power operation (effectively a shutdown) of a host processor. In a three chip embodiment, two host processors are used, a cellular processor and a visual data processor. As in the two chip embodiment, both the cellular and visual data processors can be operated in a lower power mode with substantially no processing taking place therein.

Figure 3:
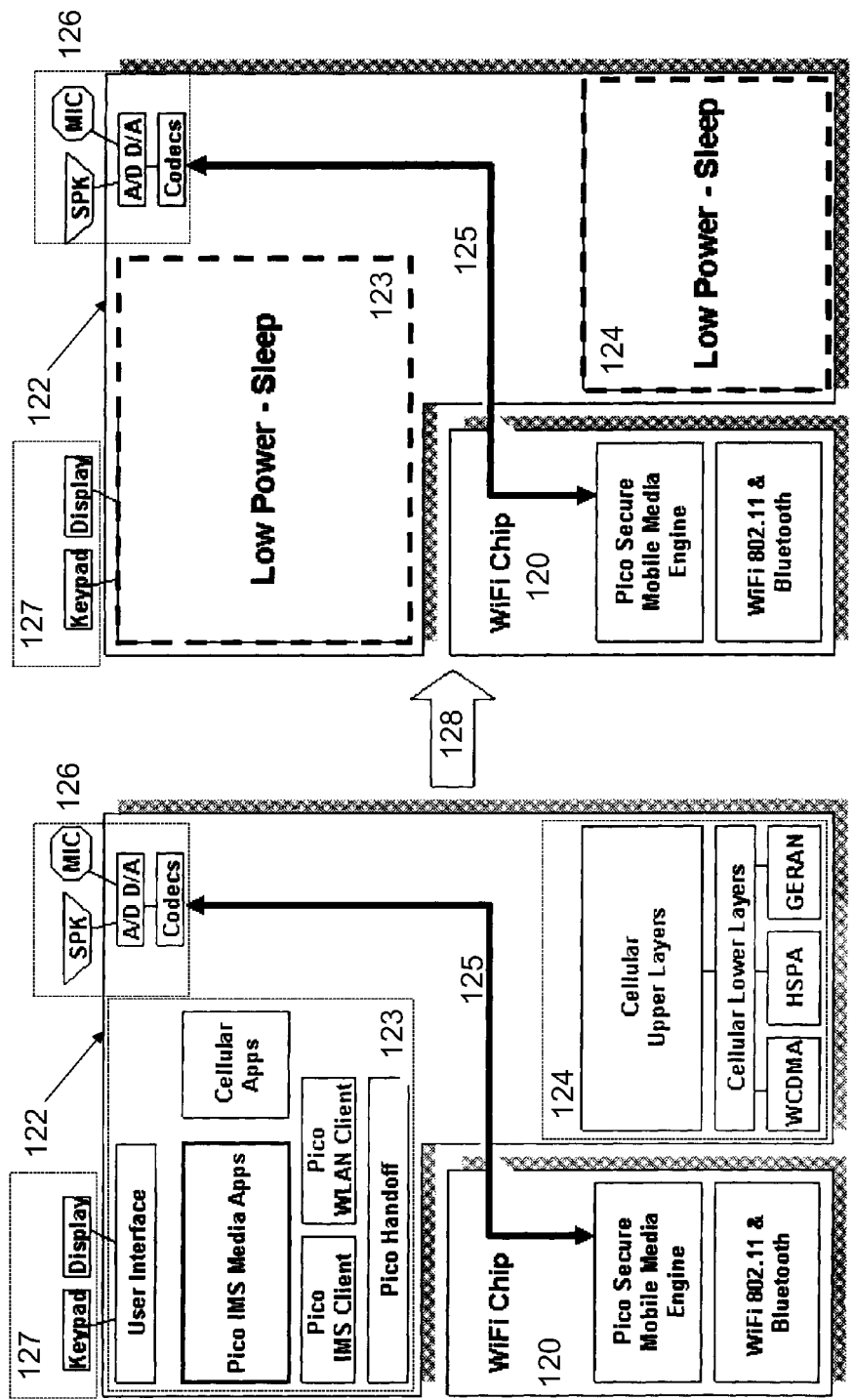
FIG. 3 shows a block diagram of a communication processor and host processor according to the invention system in a regular power mode and a lower power mode.

FIG. 3 shows a block diagram of a two chip form of the invention having communication processor 120 identified as the WiFi Chip comprising means for establishing a wireless communication session under IEEE 802.11 wireless LAN or Bluetooth IEEE 802.16 and a layer protocol processing portion identified as the Pico Secure Mobile Media Engine, which is adapted to execute data link layer (in a first or second state) and one or more upper layer protocols (in a second state) for data packet communications. A host processor 122 is shown having a User Interface as an input/output unit for first user interface 127 (a Keypad and Display) of the mobile device. The host processor 122 also comprises media portion 123, a cellular portion 124, and a second user interface 126 for voice communication input/output and having a decoder, A-D/D-A means, and a user interface a speaker and microphone. Portion 123 also comprises means for processing by way of a Pico IMS Media Apps, Cellular Apps, Pico IMS Client, Pico WLAN Client, and a Pico Handoff. The Pico Handoff acts as a portion of the switching means as described above. Portion 124 comprises means for processing by way of Cellular Upper Layers, Cellular Lower Layers, WCDMA, HSPA, and GERAN. Data packet output/input path 125 connects communication processor 120 and host processor 122 so that, when all data link layer and upper layer protocol processing is performed at the communication processor in the second state, data packets received wirelessly are processed for playout through second user interface 126. Where such a second state operating is detected, step 128 is taken, causing portions 123 and 124 to be placed in a Low Power—Sleep mode.

Figure 4:
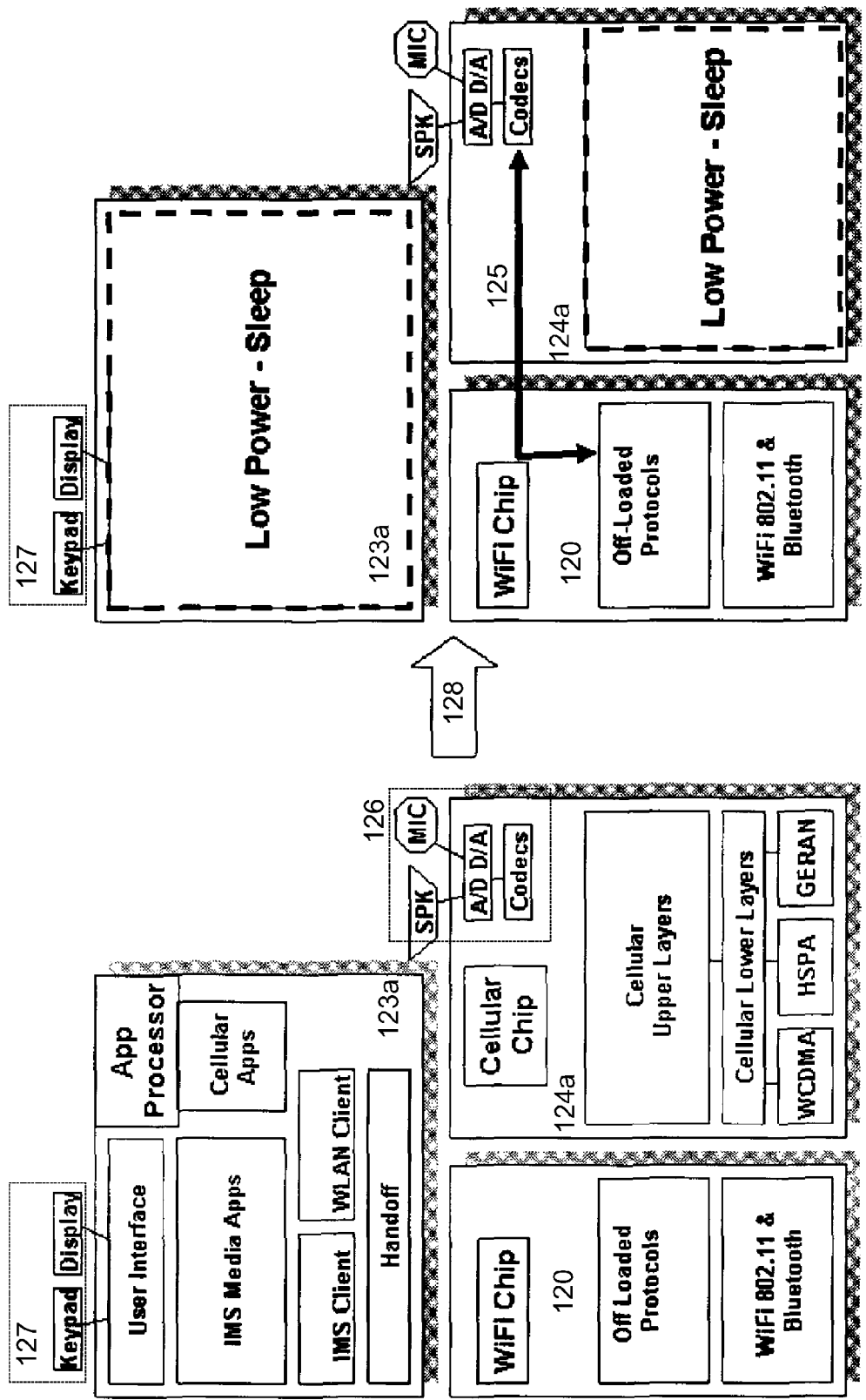
FIG. 4 shows a block diagram of a communication processor and two host processors according to the invention system in a regular power mode and a lower power mode.

FIG. 4 shows a block diagram of a communication processor and two host processors according to the invention system in a regular power mode and a lower power mode. The structure of the embodiment shown in FIG. 4 is an equivalent of the structure of the embodiment shown in FIG. 3. Communication processor 120 identified as the WiFi Chip comprising means for establishing a wireless communication session under IEEE 802.11 wireless LAN or Bluetooth IEEE 802.16 and a layer protocol processing portion identified as the Pico Secure Mobile Media Engine, which is adapted to execute data link layer (in a first or second state) and one or more upper layer protocols (in a second state) for data packet communications. A media host processor 123a is shown having a User Interface as an input/output unit for first user interface 127 (a Keypad and Display) of the mobile device. A cellular host processor 124a has a second user interface 126 for voice communication input/output and having a decoder, A-D/D-A means, and a user interface a speaker and microphone. Portion 123a also comprises means for processing by way of a Pico IMS Media Apps, Cellular Apps, Pico IMS Client, Pico WLAN Client, and a Pico Handoff. The Pico Handoff acts as a portion of the switching means as described above. Host processor 124a comprises means for processing by way of Cellular Upper Layers, Cellular Lower Layers, WCDMA, HSPA, and GERAN. Data packet output/input path 125 after step 128 connects communication processor 120 and host processor 124a so that, when all data link layer and upper layer protocol processing is performed at the communication processor in the second state, data packets received wirelessly are processed for playout through second user interface 126. Where such a second state operating is detected, step 128 is taken, causing host processors 123a and 124a to be placed in a Low Power—Sleep mode.

In specific examples, the communication processor comprises an IEEE 802.11 wireless LAN media access processor or an IEEE 802.16 media access processor, second state upper layer protocols executed by the communications processor comprise (a) IP and RTP; (b) ESP; (c) IP, RTP, and RTCP; (d) IP and IPsec-ESP under an IEEE 802.16 media access processor; and (e) generation of Media Access packets by a network layer protocol for establishing a wireless network connectivity, whereafter multimedia communication packets as output from the communication processor are transmitted by action of the host processor and the communication processor has acted to generate Internet Protocol datagrams and headers for said packets in addition to Media Access processing and has acted to generate encrypted packets encapsulated in the IP protocol headers.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:
1. A system of communicating a data set between a battery powered, wireless mobile device and a remote device, the system incorporating a wireless communications link between the wireless mobile device and a wireless communications network, the wireless mobile device comprising:
a wireless communication module;
an input/output unit effectively connected to the wireless communication module;
a microprocessor effectively connected to the input/output unit,
wherein the microprocessor includes
memory,
a real time clock,
a communications processor including (i) a first upper layer module configured to execute one or more upper layer protocols and (ii) a data link layer configured to execute a data link layer protocol, and
a host processor operable by a control program, the host processor configured to (i) process a first data set to packetize the first data set for transmission to the remote device, or ii) process packets of a second data set received from the remote device to produce the second data set,
wherein the communications processor is configured to execute only the data link layer protocol and none of the one or more upper layer protocols when the communications processor operates in a first state, and
execute the data link layer protocol and the one or more upper layer protocols when the communications processor operates in a second state, and
wherein the host processor includes a second upper layer module configured to execute the one or more upper layer protocols;
a switching module configured to cause the communications processor to operate in the first state or the second state; and
a power saving module configured to prevent the host processor from executing the one or more upper layer protocols executed by the communications processor when the communications processor operates in the second state.

2. The wireless mobile device of claim 1, wherein the one or more upper layer protocols include one or more protocols for (i) an application layer, (ii) a transport layer, and (iii) a network layer.

3. The wireless mobile device of claim 1, wherein the switching module is configured to reduce power consumed by the mobile device by causing of the host processor to operate at a low power level when the one or more upper layer protocols are executed by the communication processor.

4. The wireless mobile device of claim 1, wherein the communications processor comprises an IEEE 802.11 wireless LAN media access processor or an IEEE 802.16 wireless LAN media access processor.

5. The wireless mobile device of claim 1, wherein the one or more upper layer protocols executed by the communications processor when operating in the second state include an Internet Protocol (IP), a Real-time Transport Protocol (RTP), an RTP Control Protocol (RTCP), an Encapsulating Security Payload (ESP) protocol, and an IP Security ESP (IPsec-ESP) protocol.

6. The wireless mobile device of claim 1, wherein when a rate of transmission or reception of packets by the mobile device is greater than or equal to a predetermined threshold, the switching module is configured to:
   stop execution of the one or more upper layer protocols by the communications processor, and
   cause the host processor to execute the one or more upper layer protocols.

7. The wireless mobile device of claim 1, wherein when an available processing capacity of the communications processor is less than or equal to a predetermined threshold, the switching module is configured to:
   stop execution of the one or more upper layer protocols by the communications processor, and
   cause the host processor to execute the one or more upper layer protocols.

8. The wireless mobile device of claim 1, wherein when an available battery power of the mobile device is less than or equal to a predetermined threshold, the switching module is configured to:
   stop execution of the one or more upper layer protocols by the host processor, and
   cause the communications processor to execute the one or more upper layer protocols.

9. The wireless mobile device of claim 1, wherein the communications processor provides cryptographic acceleration for the one or more upper layer protocols.

10. A mobile device comprising:
    a communications processor including
        a first upper layer module configured to execute one or more upper layer protocols, and
        a data link layer module configured to execute a data link layer protocol;
    a host processor including
        a second upper layer module configured to execute the one or more upper layer protocols;
    a switching module configured to cause the communications processor to operate in a first state or a second state, wherein the communications processor is configured to
        execute only the data link layer protocol and none of the one or more upper layer protocols when the communications processor operates in the first state, and
        execute the data link layer protocol and the one or more upper layer protocols when the communications processor operates in the second state; and
    a power saving module configured to prevent the host processor from executing the one or more upper layer protocols executed by the communications processor when the communications processor operates in the second state.

11. The mobile device of claim 10, wherein the switching module is configured to reduce power consumed by the mobile device by causing the host processor to operate at a low power level when the one or more upper layer protocols are executed by the communication processor.

12. The mobile device of claim 10, wherein when a rate of transmission or reception of packets by the mobile device is greater than or equal to a predetermined threshold, the switching module is configured to:
    stop execution of the one or more upper layer protocols by the communications processor, and
    cause the host processor to execute the one or more upper layer protocols.

13. The mobile device of claim 10, wherein when an available processing capacity of the communications processor is less than or equal to a predetermined threshold, the switching module is configured to:
    stop execution of the one or more upper layer protocols by the communications processor, and
    cause the host processor to execute the one or more upper layer protocols.

14. The mobile device of claim 10, wherein when an available battery power of the mobile device is less than or equal to a predetermined threshold, the switching module is configured to:
    stop execution of the one or more upper layer protocols by the host processor, and
    cause the communications processor to execute the one or more upper layer protocols.

15. The mobile device of claim 10, wherein the communications processor provides cryptographic acceleration for the one or more upper layer protocols.

* * * * *